(12) United States Patent
Khadhraoui et al.

(10) Patent No.: US 8,494,777 B2
(45) Date of Patent: Jul. 23, 2013

(54) CONTINUOUS MICROSEISMIC MAPPING FOR REAL-TIME 3D EVENT DETECTION AND LOCATION

(75) Inventors: Bassem Khadhraoui, Sandy Lane (GB); Harold David Leslie, Girton (GB); Gwenola Michaud, Tokyo (JP); W. Scott Leaney, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 414 days.

(21) Appl. No.: 12/420,061

(22) Filed: Apr. 8, 2009

(65) Prior Publication Data

US 2009/0259406 A1    Oct. 15, 2009

Related U.S. Application Data

(60) Provisional application No. 61/043,709, filed on Apr. 9, 2008.

(51) Int. Cl.
*G01V 1/00* (2006.01)
*G01V 1/28* (2006.01)

(52) U.S. Cl.
USPC ................................. 702/14; 702/18; 702/16

(58) Field of Classification Search
USPC .......................................................... 702/14
See application file for complete search history.

(56) References Cited

U.S. PATENT DOCUMENTS

| | | | |
|---|---|---|---|
| 5,771,170 A * | 6/1998 | Withers et al. | 702/16 |
| 6,462,549 B1 * | 10/2002 | Curtis et al. | 324/323 |
| 6,662,109 B2 | 12/2003 | Roggero et al. | |
| 6,947,843 B2 * | 9/2005 | Fisher et al. | 702/13 |
| 6,962,549 B2 * | 11/2005 | Dreibholz et al. | 475/284 |
| 7,391,671 B2 | 6/2008 | Beom-Ju | |
| 7,391,675 B2 | 6/2008 | Drew | |
| 7,986,587 B2 * | 7/2011 | Duncan et al. | 367/40 |
| 8,041,510 B2 * | 10/2011 | Dasgupta | 702/12 |
| 8,078,437 B2 | 12/2011 | Wu et al. | |
| 2002/0087272 A1 * | 7/2002 | Mackie | 702/14 |
| 2005/0190649 A1 | 9/2005 | Eisner et al. | |
| 2006/0041410 A1 | 2/2006 | Strebelle | |
| 2006/0062084 A1 * | 3/2006 | Drew | 367/68 |

(Continued)

FOREIGN PATENT DOCUMENTS

| EP | 297737 A2 * | 1/1989 |
|---|---|---|
| GB | 2450163 | 12/2008 |

OTHER PUBLICATIONS

Young et al., Mining-Induced Microseismicity: Monitoring and Applications of Imagin and Source Mechanism Techniques, Mining-induced Microseismicity: Monitoring and Applications, vol. 139, 1992.*

(Continued)

*Primary Examiner* — Timothy H Hwang
(74) *Attorney, Agent, or Firm* — Jianguang Du; Tim Curington

(57) ABSTRACT

A method for the detection and localization of microseismic events is proposed which operates in real-time. It provides hypocenters in three spatial dimensions along with an estimate of the event origin time. Sensor positions may be distributed in 3D space, and are not confined to linear arrays in vertical wells. The method combines and improves two existing approaches. For detection and localization purposes the method makes use of the generalized beam-forming and forward modeling properties defined in the "CMM" algorithm. For location refinement, the method uses a stabilized version of the generalized "Geiger" approach.

18 Claims, 8 Drawing Sheets

U.S. PATENT DOCUMENTS

| | | | |
|---|---|---|---|
| 2006/0081412 A1* | 4/2006 | Wright et al. | 181/104 |
| 2008/0068928 A1* | 3/2008 | Duncan et al. | 367/73 |
| 2009/0010104 A1 | 1/2009 | Leaney | |
| 2009/0238040 A1* | 9/2009 | Duncan et al. | 367/38 |
| 2010/0018718 A1* | 1/2010 | Krebs et al. | 166/369 |

OTHER PUBLICATIONS

Oye et al., Automated Seismic Event Location for Hydrocarbon Reservoirs, Computers & Geosciences 29 (2003) 851-863.*

G. Michaud, S. Leaney,"Continuous microseismic mapping for real-time event detection and location," SEG Technical Program Expanded Abstracts 27 (1), pp. 1357-1361.

J. Drew, et al, "Automated Microseismic Event Detection and Location by Continuous Spatial Mapping," SPE Annual Technical Conference and Exhibition, vol. 95513, Oct. 9, 2005.

Errington, A. Sensor Placement for Microseismic Event Location, University of Saskatchewan at Saskatoon, Oct. 2006.

* cited by examiner

CONTINUOUS MICROSEISMIC MAPPING FOR REAL-TIME 3D EVENT DETECTION AND LOCATION

CROSS REFERENCE TO RELATED APPLICATIONS

This application is a non-provisional application of U.S. Provisional Patent Application 61/043,709, filed 9 Apr. 2008, the content of which is incorporated herein by reference for all purposes.

BACKGROUND OF THE DISCLOSURE

1. Field of the Invention

The present disclosure relates to methods and techniques for continuous microseismic mapping and, more particularly, methods and techniques for the real-time 3d detection of microseismic events usable in non-vertical boreholes.

2. Background of the Related Art

A reliable real-time scheme for the detection/localization of microseismic events is important for Hydraulic Fracture Monitoring (HFM) and Reservoir Monitoring (RM), to enable timely decision making during stimulation operations and for reservoir management, among other applications. Microseismic event detection, location estimation and source parameter analysis provide critical information on the position, extent and growth of fractures caused during fluid injection or through other active or passive causes.

Standard historical approaches to determining event detection and location, such as the Geiger algorithm, have relied on time-picking of P-wave and S-wave arrival phases together with the computation of P-wave polarization. These approaches have been applied to individual sensor channels and hence have tended to be unstable and unreliable in the presence of significant noise. Accordingly, intervention, pick verification, and manual pick adjustment have often been required, but those steps are time consuming and do not permit real-time operation.

A model-based algorithm to image the distribution of microseismic sources in both time and space has been described and applied to episodic tremors in a subduction zone. An efficient implementation of a similar method was developed for HFM and is disclosed in U.S. Pat. No. 7,391,675, which is hereby incorporated in its entirety. In particular, the '675 reference discloses what has been referred to as the Coalescence Microseismic Mapping (CMM) technique for real-time event detection and localization of seismic events. This approach does not require that discrete time picks be made on each of the waveforms. Rather, individual streams of seismic multi-component waveforms at each sensors are operated upon continuously using a function former, such as a signal-to-noise ratio (SNR) estimator. The output of the function formers from all sensors are then individually mapped (migrated) into a 4D space-time map of hypocenter and origin time using model based travel times. This allows simultaneous event detection and localization by identifying map locations and origin times for which a collective or multi-sensor processor output exceeds a detection threshold. Waveform polarization is included in the discrimination algorithm both as a means of distinguishing consistent portions of the waveform streams which contain P-wave and S-wave phases that are being mapped, and as means of orienting a vertical (radial-depth) plane of localization, as the mapping algorithm is run in a 2D rather than 3D spatial geometry. In other words, the CMM algorithm delivers in real-time, event detection and location based on a signal to noise ratio onset measure using modeled travel times of P and S-waves.

Moreover, it should be noted that the CMM algorithm is a robust event-detector in the presence of noise, and that is it is very efficiency in making an event detection and location by assuming a vertical receiver array or, more precisely, by assuming that the seismic signal receivers are disposed in the wellbore are positioned in the plane containing the center of a target grid. However, the CMM technique as described above has some inherent drawbacks, including that it has not provided standard measures of localization uncertainty which in the past have been computed from the measurement versus model residuals associated with discrete time picks, and that the assumed geometries cause the accuracy of the above approach to break down as wellbore deviation increases and events move away from the target plane. The CMM technique may also encounter drawbacks for multi-well data acquisition, where the ability to handle an arbitrarily distributed receiver network is preferred.

SUMMARY OF THE DISCLOSURE

According to one exemplary embodiment disclosed herein, a method of detecting and locating a microseismic events is disclosed. The method includes providing an estimate of a velocity model for a formation; estimating a volume of space in which the event will most likely occur; dividing the volume into a plurality of sub-volumes; receiving data of a microseismic event with at least a first and a second seismic sensor located on a tool in a wellbore; approximating a location of the even in the volume to determine in which sub-volume the event occurred; and determining a more precise location of the event by locating the event within the sub-volume utilizing the signals.

According to another exemplary embodiment disclosed herein, a method of detecting and locating a microseismic events is disclosed. The method includes providing an estimate of a velocity model for a formation; estimating a volume of space in which the event will most likely occur; dividing the volume into a purality of sub-volumes; receiving data of a microseismic event with at least a first and a second seismic sensor located on a tool in a wellbore; approximating a location of the even in the volume to determine in which sub-volume the event occurred; and determining a more precise location of the event by locating the event within the sub-volume utilizing the signals.

According to yet another exemplary embodiment disclosed herein, a method of detecting and locating a microseismic events is disclosed. The method includes ggenerating a 3D spatial sampled volume of potential hypocenter locations; generating a look-up table for the P and S transit-times as well as the P and S-waves azimuth and dip angles at each grid node in the volume; computing the multicomponent covariance matrix while reading waveforms; storing the largest eigenvalue and its associated eigenvector as a function of time; applying an STA/LTA time-picker to the principal component; computing and storing the measured azimuth and dip for the eigenvector; computing CMM for a decimated grid; storing for every time sample the largest value of CMM when applied to the coarse grid; obtaining a rough estimate of a detected microseismic event with an origin time; determining a refinement of the event origin-time and spatial coordinates by applying a grid-search to the CMM objective function over a finer sampling of the solution domain; obtaining an event location and origin-time along with a set of model travel-times and estimated incidence azimuth and dip angles; obtaining refined arrival-time estimates and associated measured incidence azimuth; conducting a grid search of the Geiger residual-function; using the returned result as an initial guess in the gradient search for the minimum of the Geiger residual function; and estimating the final location of the micro seismic event.

BRIEF DESCRIPTION OF THE DRAWINGS

The accompanying drawings illustrate certain embodiments and are a part of the specification. Together with the following description, the drawings demonstrate and explain some of the principles of the present disclosure.

Figure 1:
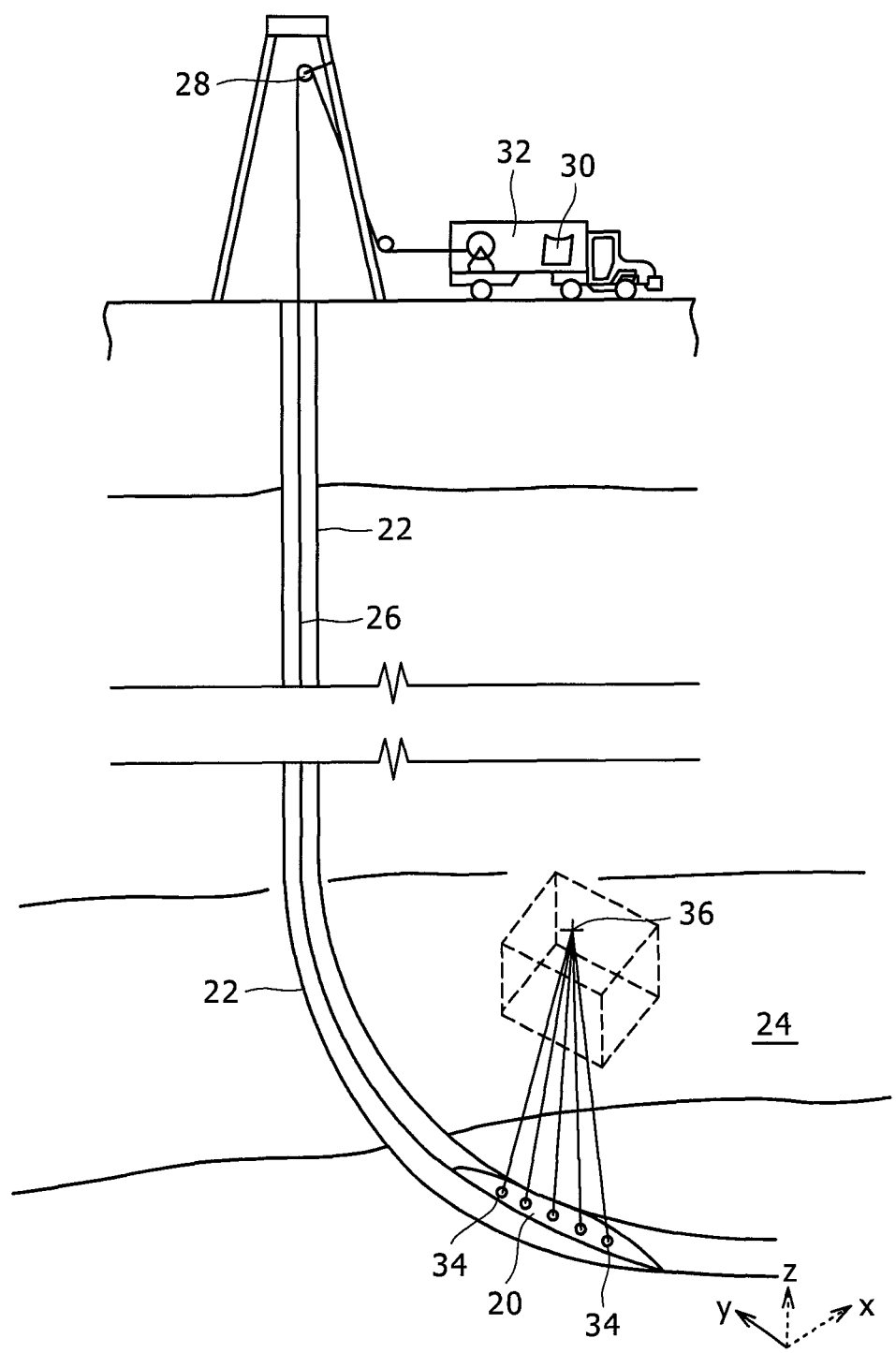
FIG. 1 is a side sectional view of one exemplary application—a tool receiving signals in a deviated/horizontal wellbore—to which the present disclosure may be applied.
Figure 2:
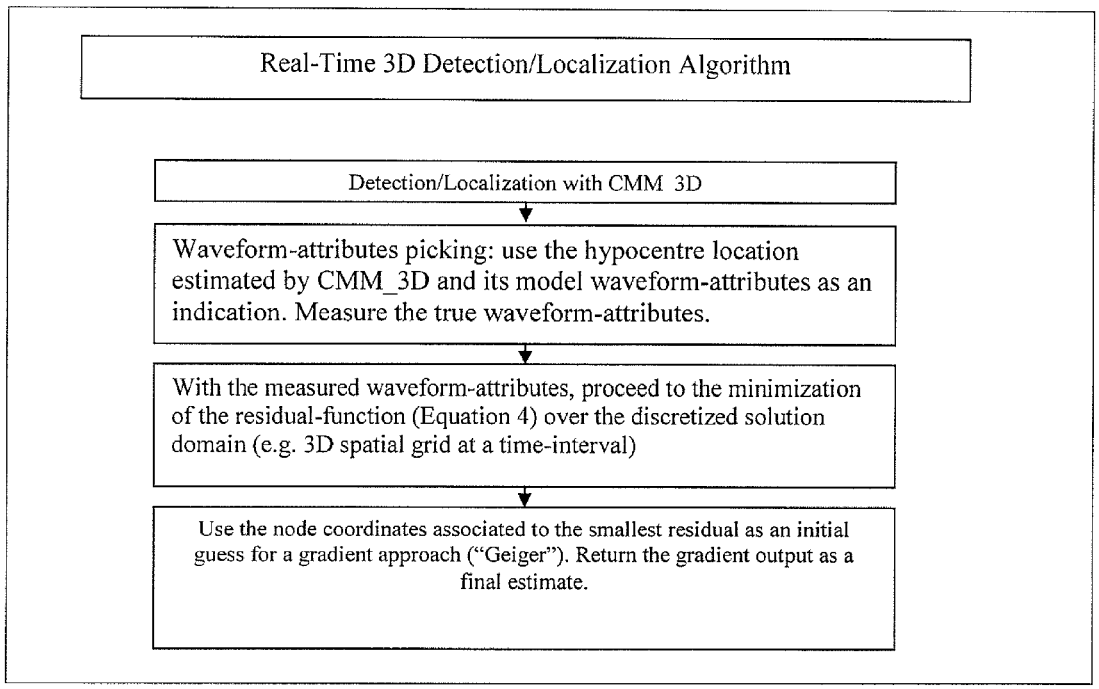
FIG. 2 is a flowchart depicting a general processing flow of the real-time microseismic event detection/localization algorithm disclosed herein.
Figure 3:
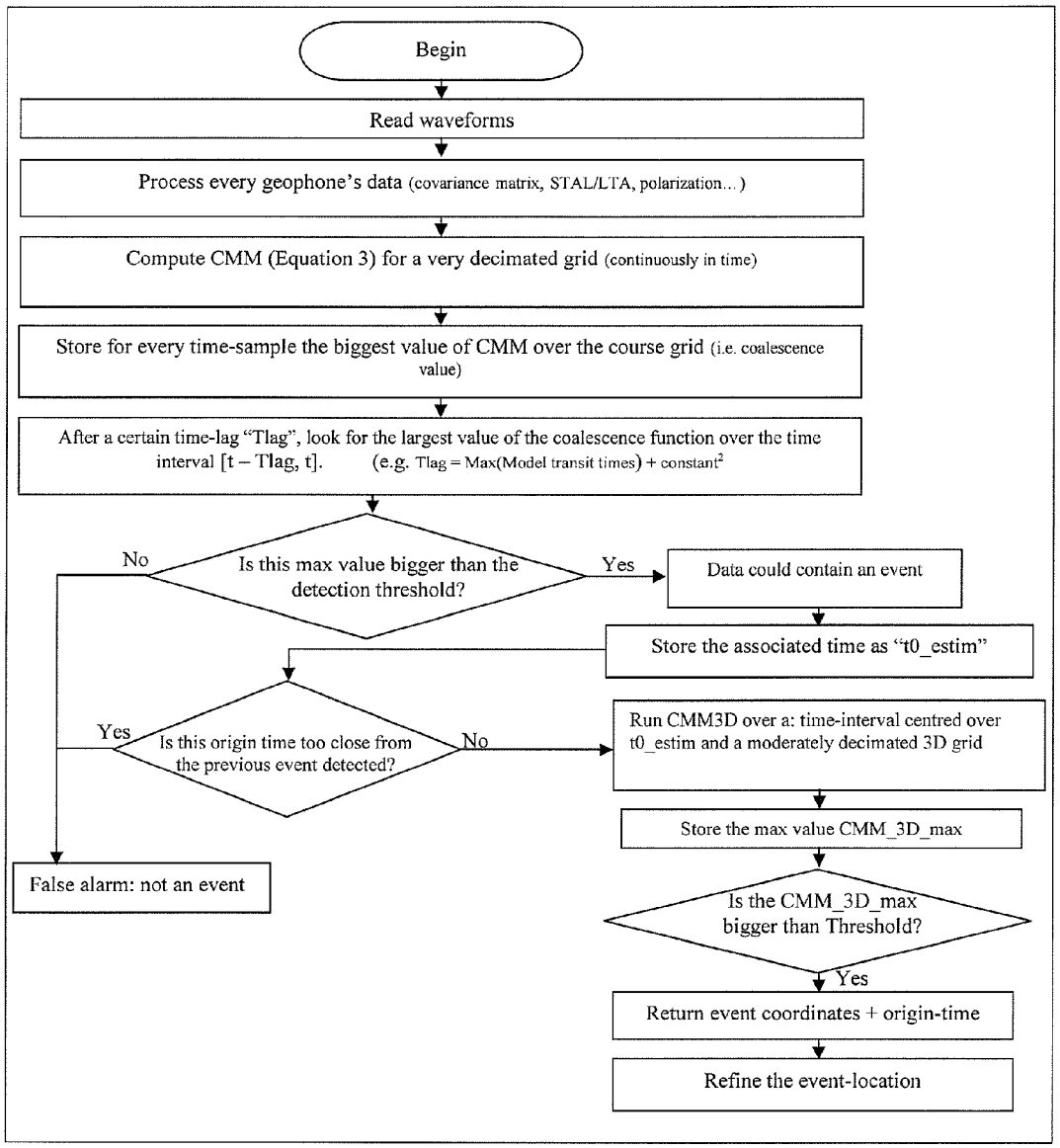
FIG. 3 is a flowchart of a processing algorithm with emphasis on a detection and localization portion of the algorithm.
Figure 4:
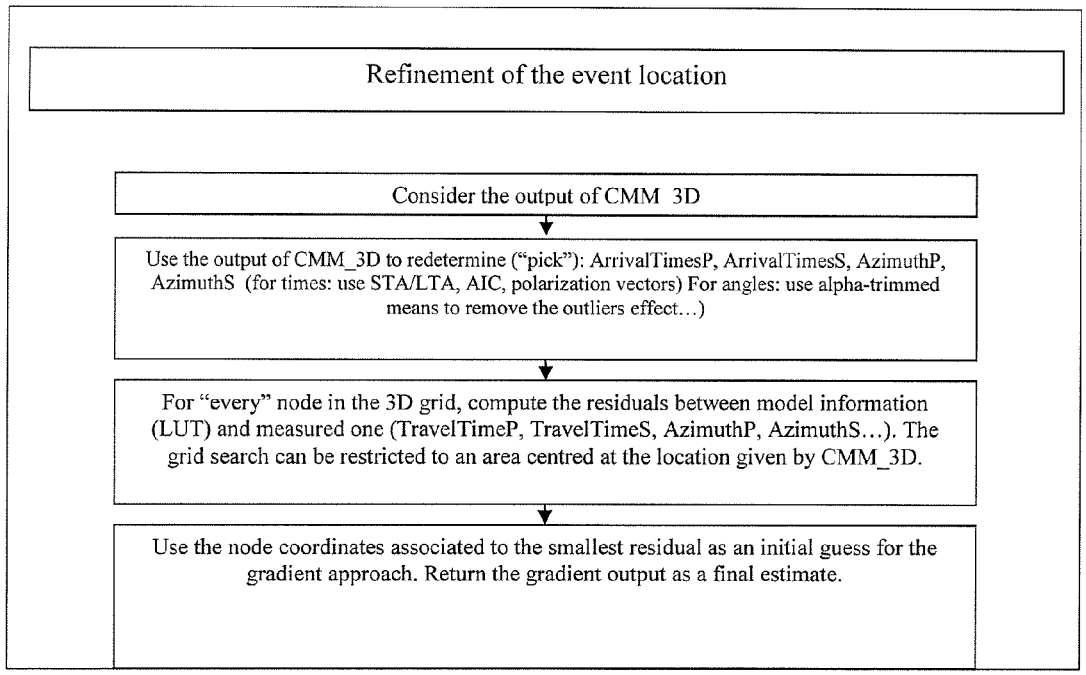
FIG. 4 is a flowchart of a processing algorithm with emphasis on a location refinement portion of the algorithm.

While the principles described herein are susceptible to various modifications and alternative forms, specific embodiments have been shown by way of example in the drawings and will be described in detail herein. However, it should be understood that the disclosure is not intended to be limited to the particular forms disclosed. Rather, the disclosure includes all modifications, equivalents and alternatives falling within the scope of the appended claims.

DETAILED DESCRIPTION

So that the above recited features and advantages of the present invention can be understood in detail, a more particular description of the invention, briefly summarized above, may be had by reference to the embodiments thereof that are illustrated in the accompanied drawings and graphs. It is to be noted, however, that the drawings illustrate only typical embodiments of this invention and are therefore not to be considered limiting of its scope, for the invention may admit to other equally effective embodiments.

FIG. 1 is a schematic illustration of one exemplary embodiment and one exemplary method of deployment, showing a system including a downhole tool that may be used in conjunction with the methods described herein. The system of FIG. 1 depicts a seismic tool 20 disposed in a borehole 22 adjacent a formation of interest 24. The tool 20 may be deployed using conventional logging cable 26, or by another method of deployment that is consistent with the principles described herein. For example, known modes of deployment such as wireline, coiled tubing, slick line, among others, may be employed according to the principles described herein or may be used in conjunction with a permanent or semi-permanent seismic monitoring system. Furthermore, the disclosure herein contemplates applications in well services, underground gas and waste storage, hydraulic fracture monitoring, reservoir and formation monitoring, and similar areas that require seismic source location. Referring again to FIG. 1, the cable 22 may be looped through a pulley 28 of an oilrig in a known conventional arrangement. The cable 22 also may include transmission lines for data transmission to and from the surface. In this, signals may be transmitted electrically or optically to and from a processing unit 30 that may be disposed in a service truck 32, or by any other conventional arrangement.

The tool 20 includes a plurality of receivers 34 that may be disposed in the tool 20 in various configurations, including being disposed vertically along the length of the tool 20 or along the y-axis as shown in FIG. 1. The formation of interest 24 will also include a plurality of points of interest 36 (e.g. fractures in the formation) that are the focus of the preset application.

Descriptions of Signal-Processing Aspects of the Detection Localization Techniques The detection and localization method proposed here involves multiple stages. The first stage is based on a map migration technique which does not require time picking, but does use continuous function forming to produce a measure of SNR, the signal-to-noise ratio. It also uses a continuous estimate of waveform polarization versus time. The second stage performs guided time picking, and uses discrete time picks along with associated polarization estimates to compute measured versus modelled data error residuals. The error residual objective function is then minimized in several substages to search over the hypocenter/origin-time domain.

Time Picking

Waveforms from an event generally differ between geophones. This makes multi-channel time picking difficult. Most methods in the literature time-pick on a single-channel basis. A popular method for arrival-time picking on a single-channel basis uses the Short Time Average/Long Time Average (STA/LTA) operator described by Baer & Kradolfer which utilizes second order moments. The generalisation of this operator with higher-order statistics (e.g. ratio of exponents of moments of even orders) is an alternative to the STA/LTA. Other operators such as change-point estimation using linear prediction and the Bayesian/Akaike Information Criterion may also be employed and alternative methods for picking time include:

Polarization based techniques: orthogonality of the polarization vectors at the compressional and shear arrival-times, analysis of the different ratios between eigenvalues of the covariance matrix computed continuously in time and their generalization to multichannel techniques.

Analysis of the waveform content: peaks, troughs, zero-crossings, amplitude/frequency variation, amplitude/frequency comparison to a threshold value . . . and their generalization to multichannel techniques.

The current method applies the STA/LTA operator to the largest principal component of the waveforms for two reasons: computational run-time is considerably improved; the data quality is higher, i.e. the principal component signal is smoother and, in the testing that has been conducted, has shown a higher signal-to-noise ratio than the Hilbert envelope. However, the use other envelopes (e.g. the "Hlbert envelope", the Baer and Kradolfer envelope, sum of the squared amplitudes of the seismograms . . . ) is not excluded. The principal components are computed using Principal Component Analysis (PCA) applied to the three-component (3C) waveforms of each geophone. In particular, the principal components (i.e. the eigenvalues and associated principal eigenvectors) are continuously computed in time using windowed data segments.

When applied to the principal component data, the STA/LTA operator returns a flat curve with sharp peaks occurring at the P and S-arrivals in the time-domain. Such a curve presents similarities from receiver to receiver. By construction, the STA/LTA signal is hence very adequate for high-resolution time-delay estimators such as cross-correlation.

Polarization

Polarization is used to estimate the component incidence-angles of the arriving wave. Estimating polarization can be done in the frequency, time or wavelet domains. A time-domain approach for measuring incidence angles is appropriate for real-time HFM purposes.

In order to measure polarization for a three-component geophone, the covariance matrix of the three waveforms components is computed over a time-window. For the case of the P-wave in isotropic materials, the direction of arrival is given by a principal eigenvector of the covariance matrix. In anisotropic materials corrections must be made to determine the ray direction vector from the P-wave polarization. The incidence-angles are subsequently deduced from this vector.

Time-domain polarization estimates may be based on the use of real signals or analytic (complex) signals. Analytic signals are more stable at amplitude zero-crossing and can provide instantaneous polarization. However, determination of real incidence angles from the eigenvectors of the covariance matrix of multi-component analytic signals requires additional assumptions and is computationally more costly. In testing, it was found that there is little practical difference between incidence angles computed from real or analytic signals. For the purposes of real-time calculations, time-domain polarization estimation based on the use of real rather than complex signals is preferable, but the present technique accommodates polarization computation by either technique. Furthermore, additional processing steps which improve the final estimate of polarization vectors and incidence angles are:

(a) Picking Incidence-Angles and Polarization Vectors: Outlier Removal

In order to obtain stable estimates of polarization angles it is useful to reduce sensitivity to noise by combining estimates made over a time interval around the first arrival of each waveform phase. The alpha-trimmed mean operator returns an average centred on the median value over this time interval. Depending on the choice of alpha, the returned value can vary from the median value (i.e. maximum rejection of potential outliers) to the average value of all the samples (i.e. zero rejection of samples when averaging).

(b) Removal of Direction of Uncertainty Provided by Polarization

When measuring incidence-angles, an uncertainty of the order of 180 degrees can influence the results. This uncertainty is due to the nature of the method used for estimating angles. Angles are computed from eigenvectors provided by the PCA. It is known that two vectors pointing in opposite directions are eigenvectors of the same matrix associated to the same eigenvalue. Two techniques may be used in order to remove this uncertainty:

1. Prior knowledge regarding the area of interest is used to "manually" set the direction to which these vectors should point.
2. A receivers' network hull is defined. A convex hull or a cross-section of the beam of rays for instance could be considered. Every receiver presents two unit polarization-vectors pointing to two opposite directions. If the receivers' network hull is "propagated" following the true polarization vectors (i.e. toward the source), then its size should shrink as it gets closer to the source location.

Main Optimization Techniques

The event localization problem is an inversion problem. It is a search for a best-match between a set of measurements made on real data and the associated model values. Hence, provided that the model chosen is consistent, the event localization is defined as an optimization problem. The "match-function" between model and measurements is called a residual-function or error-function. However, the search method used for identifying the extremum depends on the residual-function behaviour. The main classic optimization techniques that can be considered include: (a) Grid search; (b) "Beta"-section; (c) Gradient; (d) Simplex; (e) Probabilistic algorithms.

(a) Grid search: this technique is reliable as the function is evaluated over its entire domain of definition. The result returned will be the global minimum if the domain is sampled finely enough.
(b) "Beta-section" methods: sometimes referred to as multi-resolution method (i.e. family of bi-section and golden-section methods and their generalization to multi-variable problems such as "quadtrees" . . . ).
(c) Gradient: the gradient strategy often offers the most attractive trade off between run-time and accuracy. Depending on the use of the Hessian and its possible approximation, these methods are often referred to as "Newton" or "quasi-Newton" methods. In addition to the "Newton" method, we can refer to the "Steepest Descent", "Marquardt-Levenberg and Trust-Region", and "conjugate-gradient" procedures.
(d) Simplex: the Nelder-Mead simplex approach and its variants are the key references. This report suggests an alternative to the original nonlinear simplex. Based on a line-search, we can use adaptive steps in order to improve the convergence speed of the algorithm. These steps will be computed respectively at the so-called stages of "Contraction", "Expansion" and "Reflection". In addition to the line-search, we can introduce the use of the concept of adaptive search-directions. The search-directions for the three named stages can be defined by the selection of a search of a direction in which the line-search will operate.
(e) Probabilistic: Probabilistic algorithms include the Monte Carlo and the metaheuristies techniques. The most popular of these algorithms are probably the "simulated annealing" and "genetic algorithms". The "tabu search", "hill climbing", "ant colony" and "particle swarm" can also be considered.

Descriptions of Detection/Localization Techniques

In one exemplary embodiment, the proposed method for microseismic event detection and localization has several stages of processing which differ in their quantification of mismatch between model and measured values, their choice of objective function, and the procedure used to minimize or maximimize that function. This section describes the techniques used in those stages and the order in which they are used in the new processing flow. The following section gives a description of the flow of the multi-stage processing.

The first challenge in microseismic data processing is the detection of micro-earthquakes (microseismic events) in the continuous flow of recorded data. Due to the lack of prior knowledge about the arrivals-moveout, detection is often based on the use of the STA/LTA operator described earlier. Reliable techniques manage to proceed on a multichannel basis. The CMM technique has been employed effectively for the purpose of multi-channel event detection, and is included in the proposed workflow.

When an event is detected, its hypocenter needs to be located. The fundamental principle consists of finding the event origin in space and time yielding the best match between the measurements made and the corresponding computed model values. The algorithm developed by Geiger in 1912 is now commonly used for this purpose. This disclosure proposes using it as part of the finishing stages in a multi-stage processing approach. As such it can be used in real-time with improved reliability, and can be used to refine the initial hypocenter locations determined using CMM. An extra penalizing-term is added to the residual-function. Such a term can be based on prior knowledge about the sought solution location or properties. The use of such a term penalizes the consideration of candidate hypocenters with undesired properties. A list of properties that can be used to discard such candidate is given by Spatial position: based on the distance of the considered candidate to a given location (e.g. "check-shot" location) or a region, a value is returned to penalize the consideration of the candidates that are too far from the area of interest.

Waveform content: Waveform content such as the RMS, polarization type, polarization vectors . . . will be considered to discard candidates.

The use of such a constraint has previously been described within probability based event location algorithms (Bayesian) which employ grid searching. Here we include them as part of gradient search algorithms.

Coalescence Microseismic Mapping (CMM)

Considering the issues related to time-picking in the Geiger algorithm, an alternative automatic solution, Coalescence Microseismic Mapping (CMM), was developed by Drew et al. (see the '675 patent). It detects and localizes microseismic events in real-time. Time-picking is not required anymore as the algorithm proceeds simultaneously to perform detection and localization. Moreover, CMM uses a variant of delay-and-sum beam-forming for detection purposes. The method is hence very robust to noise.

Figure 5:
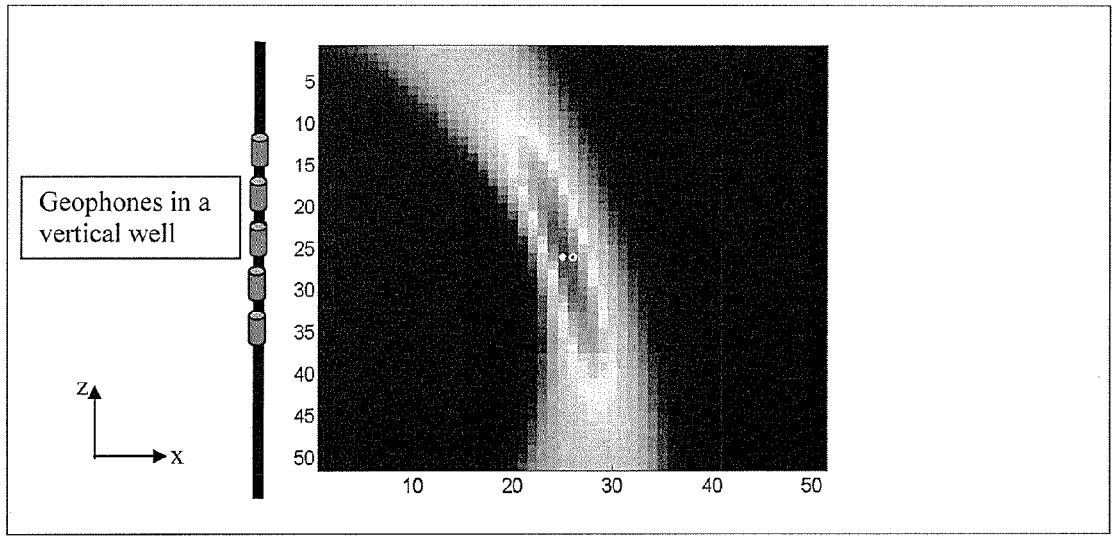
FIG. 5 is a CMM2D, map of an objective function in a vertical plane (x, z)
Figure 6:
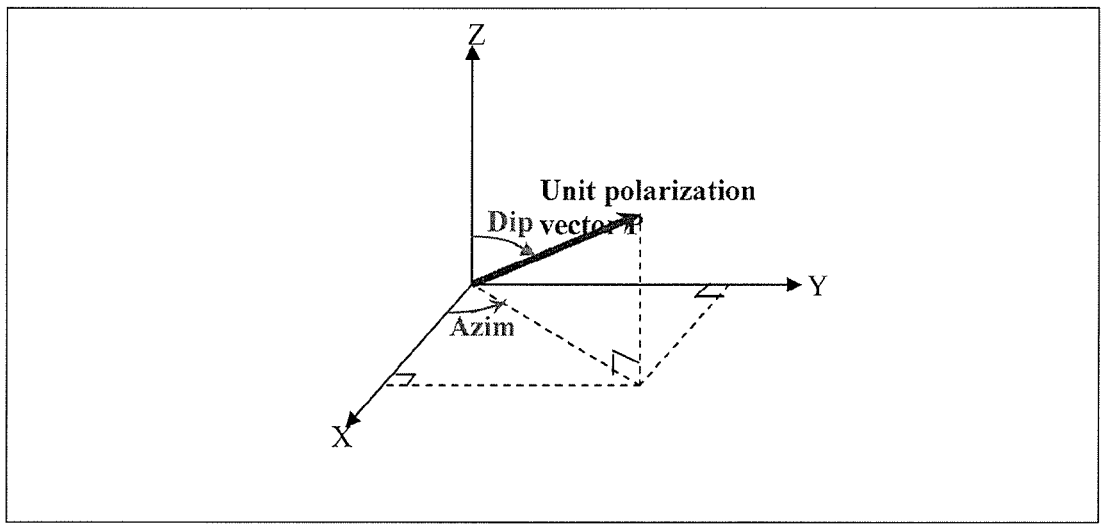
FIG. 6 is an illustration of a polarization vector and incidence angles.

In order to run in real time, CMM makes use of symmetry properties. The velocity models that are currently in use are often one-dimensional vertical anisotropic models. If the set of geophones is assumed to be vertical, then the localization problem presents an interesting symmetry around the vertical axis. Instead of localizing the hypocentre in a 3D space, one simply needs to locate it in a vertical plane first, based on this symmetry property. The purpose is to get an estimate of depth and radial distance of the event location to the vertical array of multicomponent geophones (FIG. 5). The final event location is therefore obtained by rotating the considered plane around the vertical axis. The rotation angle is given by the azimuth of the P-waves (average of the measured azimuths over the geophones). The detection/ocalization is defined as the maximization of a three-variable objective function. These variables are origin-time, radial distance to the geophones-array and depth of the event. The search of maximum is based on the grid search. The returned maximum corresponds to the event spatial coordinates and origin-time.

The CMM algorithm is a combined detection/localization scheme in which a continuous input data stream (rather than a few discrete picked data time points) are mapped into hypocenter/origin time candidates using modelled data values. It is sometimes referred to as "model driven" in that detection as well as localization depends on the match between measured and modelled data. Its location accuracy is controlled by the solution domain sampling (gridding of the vertical plane (x, z) at discretized time-intervals). For instance, a densely sampled plane allows very accurate mapping but is very slow to scan. A compromise needs to be found between location accuracy and algorithm run-time.

The beamforming applied by CMM differs in several ways from simple waveform, delay and sum beamforming. Firstly, it does not operate on the waveforms directly, but on their STA/LTA transforms. Secondly, the delayed and summed characteristic function is formed from a product of STA/LTA and other factors. The objective function obtained is subject to a constraint of orthogonality between polarization vectors measured at the P and S-waves arrival-times. Equation (1) describes the CMM objective function at a candidate "location" (x, z, t):

$$CMM2D(\vec{x},t)=\Sigma_{rec}[STALTA_{rec}(t+TT_P^{model}(\vec{x},rec)).STALTA_{rec}(t+TT_S^{model}(\vec{x},rec)).FP_{rec}(\vec{x},t)], \quad (1)$$

where $\vec{x}=(x,z)$, (x, z, t) is a candidate <<location>> (i.e. hypocentre and origin-time), $TT_P^{model}$ (resp. $TT_S^{model}$) is the P-wave (resp. S-wave) traveltime from $\vec{x}$ to the considered receiver location, $$FP_{rec}(\vec{x}, t) = 1 - \overline{PolarizVector_{rec}(t + TT_P^{model}(\vec{x}, rec))} \cdot \overline{PolarizVector_{rec}(t + TT_S^{model}(\vec{x}, rec))},$$

rec=receiver index, 0<rec<(N+1),

N=number of receivers and $$\overline{PolarizVector_{rec}(t + TT_P^{model}(\vec{x}, rec))}$$

is the polarization vector at the model P-wave arrival-time for this candidate hypocentre, origin-time and receiver position.

The limitation of CMM or CMM2D remains its assumption about the geophone positions. If the geophones are located in a deviated, horizontal well, or simultaneously logged in two monitoring-wells, then the assumptions of the current implementation are violated. A solution with reduced constraints on the sensor positions is discussed in the section titled "Proposed Detection and Localization Techniques".

Linearized Iterative Inversion ("Geiger")

The Geiger approach consists of defining and minimizing a residual-function in the least-square manner (equation 2).

The search of the minimum is accordingly based on a gradient routine. Given a candidate hypocenter location and origin-time $\vec{h}$, the least-square residual-function is given by equation (2):

$$R(\vec{h}) = \frac{1}{2}(\text{model}(\vec{h}) - \text{measure})^T \cdot C_{measure}^{-1} \cdot (\text{model}(\vec{h}) - \text{measure}) + Prior(\vec{h}) = \frac{1}{2} r^T \cdot C_{measure}^{-1} \cdot r + Prior(\vec{h}) \quad (2)$$

where $C_{measure}^{-1}$ represents the inverse of the weight matrix (e.g. covariance matrix) and "prior" is a penalisation term that can for example be provided by the Bayesian theory.

The minimization of the residual-function, defined in equation (2), is based on the simultaneous minimization of the two terms of the equation. Minimizing the first term is often referred as a minimization of the $L_2$ norm. The first-term of equation (2) depends on the choice of the norm used and the waveform attribute chosen. Depending on the selected norm, a different weighting may be applied. The first term is therefore strictly defined as a function of a norm assessing the misfit between model and measure values.

In equation (2), "model" refers to any waveform attribute that be modelled and measured. It can refer to:

- Travel-time of the P and S-waves.
- Arrival-time of the P and S-waves.
- Angles (azimuth, dip or any combination) of the P and S-waves.
- Polarization vector (or any projection) of the P and S-waves.
- Waveform amplitudes extracted over a window of the P and S-waves.
- Waveforms phases of the P and S-waves.
- Waveforms frequencies of the P and S-waves.
- Full-waveforms
- Any combination of the previous mentioned parameters After measuring the selected parameters, it is recommended to quality-control the picked values. For example, based on prior knowledge, a comparison of the values can be done from receiver to receiver. Another alternative consists of comparing the values between the P and S-waves for the set of receivers. Unexpected values of arrival-times, angles can therefore be detected and removed or corrected before proceeding to the minimization of the residual-function.

TABLE 1

Summary of a classic Geiger algorithm

First:

Choose a list of waveform attributes to be measured and modeled (e.g. arrival-times and ray incidence-angle azimuths and/or dips, for both P and S-waves).
Choose/define a mismatch quantifier between individual measure and model values.
Define an error-function from the sum of a residual-function and a penalizing term (e.g. a weighted least-squares function).
Choose an optimization technique (e.g. a gradient method).
Define an exit-condition for the search of extremum of the residual-function.

TABLE 1-continued

Summary of a classic Geiger algorithm

Input:

P and S velocity models.
Measured values of the waveforms' attributes (e.g. P and S arrival-times and ray incidence-angle azimuths and/or dips).
Receivers' spatial-coordinates.
Area of interest (spatial volume at a given time-interval).
Algorithm:

Search the minimum of the error-function in its domain of definition until the exit-condition is satisfied.

Although popular for its localization accuracy and its run-time, this type of algorithm presents issues. First, the waveform-attributes (e.g. arrival-times) need to be reliably picked which is a delicate task in real-time. Second, due to the optimization technique chosen, the location returned may not correspond to the true source location.

Proposed Detection/Localization Technique

CMM is very stable for event detection due to its beam-forming and forward-modelling properties. When provided with accurate arrival-time estimates, the Geiger approach is more accurate in localization. Removing the assumption of geophone array verticality in CMM means that the objective-function needs to be maximized over a time-interval and spatial-volume (instead of a vertical plane). Proceeding to such a search in real-time is very challenging. It can nevertheless be achieved if the domain of solution is properly sampled and if an adequate optimization technique is applied. As the new problem does not present any symmetry, the objective-function (equation 1) needs to be modified. Incidence-angles (e.g. P-waves azimuth and/or dip) need to be included, as shown in equation (3). As a result, localization uncertainty is reduced. Other possible CMM objective functions are defined in the Appendix.

$$CMM(\vec{x}, t) = \sum_{rec} [\text{Part1}(\vec{x}, t, rec) \cdot \text{Part2}(\vec{x}, t, rec)] \quad (3)$$

where:

$$\text{Part1}(\vec{x}, t, rec) = (STALTA_{rec}(t + TT_P^{model}(\vec{x}, rec)))^{n1} \cdot (STALTA_{rec}(t + TT_S^{model}(\vec{x}, rec)))^{n2}$$

$$\text{Part2}(\vec{x}, t, rec) = (FP_{rec}(\vec{x}, t))^{n3} \cdot (FAzimP_{rec}(\vec{x}, t))^{n4} \cdot (FDipP_{rec}(\vec{x}, t))^{n5} \cdot (FAzimS_{rec}(\vec{x}, t))^{n6} \cdot (FDipS_{rec}(\vec{x}, t))^{n7}$$

$(\vec{x}, t) = (x, y, z, t)$ is a candidate <<location>> and $$FP_{rec}(\vec{x}, t) = 1 - \overline{PolarizVector_{rec}(t + TT_P^{model}(\vec{x}, rec))} \cdot \overline{PolarizVector_{rec}(t + TT_S^{model}(\vec{x}, rec))}$$

$$FAzimP_{rec}(\vec{x}, t) = |\cos[\alpha(Azimuth_{rec}^{measured}(t + TT_P^{model}(\vec{x}, rec)) - Azimuth_{rec}^{model}(\vec{x}))]|$$

$$FDipP_{rec}(\vec{x}, t) = |\cos[\alpha(Dip_{rec}^{measured}(t + TT_P^{model}(\vec{x}, rec)) - Dip_{rec}^{model}(\vec{x}))]|$$

$$FAzimS_{rec}(\vec{x}, t) = |\cos[\alpha(Azimuth_{rec}^{measured}(t + TT_S^{model}(\vec{x}, rec)) - Azimuth_{rec}^{model}(\vec{x}))]|$$

$$FDipS_{rec}(\vec{x}, t) = |\cos[\alpha(Dip_{rec}^{measured}(t + TT_S^{model}(\vec{x}, rec)) - Dip_{rec}^{model}(\vec{x}))]|$$

rec=receiver index; 0<rec<(N+1); N=number of receivers; n1, n2, n3, n4, n5, n6 and n7 are real numbers not all equal to zero, α is a unitless weighting scalar (So the cosine operator is applied to angles, $TT_P^{model}$ (resp. $TT_S^{model}$) is the P-wave (resp. S-wave) traveltime from $\vec{x}$ to the considered receiver location.

Note that for either P-waves and/or S-waves, the ray vector at the receiver must be determined from the particle motion polarization. For anisotropic models, the relation between ray-vectors and polarization depends functionally on the velocity model and the angle of incidence. For S-waves, additional measurements or processing may be required to provide an estimate of vertical phase velocity in order to estimate the ray direction.

Depending on the data quality, it is possible to use a different discrimination factor for the azimuth or dip angle values of both P and S-waves. For excellent data quality, it is possible to use the following expressions:

$$FAngleP_{rec}(\vec{x}, t) =$$
$$\exp\left[-a \cdot (Angle_{rec}^{measured}(t + TT_P^{model}(\vec{x}, rec)) - Angle_{rec}^{model}(\vec{x}))^{2n}\right],$$

where n is a positive number $$FAngleS_{rec}(\vec{x}, t) =$$
$$\exp\left[-a \cdot (Angle_{rec}^{measured}(t + TT_S^{model}(\vec{x}, rec)) - Angle_{rec}^{model}(\vec{x}))^{2n}\right],$$

where n is a positive number where: "a" is a positive factor controlling the discrimination sharpness. For real-data, such a factor needs to be carefully chosen. If "a" is too large, then good candidate locations may be excluded. Moreover, the STAILTA factors may lose their predominance in the objective-function. On the other hand, if "a" is too small, then the opposite effect happens. Previously in application of the Bayesian approach, "a" has been set to the reciprocal of the angle measurement uncertainties. Depending on the choice of angle (i.e. dip or azimuth), "FAngleP" (resp. S) can be an alternative to "FAzimP" or "FDipP" (resp. "FAzimS" or "FDipS") in Equation 3.

Even when provided with a pre-computed set of model values (i.e. "lookup" table), it appeared that evaluating the objective-function of CMM at a candidate location was slower than evaluating a Geiger residual-function. Therefore, the algorithm presented in this disclosure took into consideration this observation and reduced the number of evaluations of the CMM objective-function. As a first step, CMM is subsequently only evaluated on a coarse grid. As a second step, the Geiger residual-function instead of the CMM objective-function is computed at the nodes of a finer grid in order to be consistent with the third step in which the refinement of the location is obtained by the classic gradient-based Geiger algorithm. Thus the output location is returned after the minimization of the same ("Geiger") residual-function by two consecutive search-techniques: a grid search followed by a gradient procedure.

Due to its properties, CMM is used as an event detector and gross-location estimator. The location refinement is overall given by a Geiger minimized residual technique. The reason for such an approach is to be able to use CMM as a robust response to all the issues raised by the classic Geiger method. CMM is stable for detecting and locating events with a given resolution. When an event is detected and located with CMM, one can confidently use the modelled arrival-times to initiate accurate measurement of both arrival-times (picking) and associated angles of the picked wave type. Subsequently, the measured waveform attributes ought to be reliable as good approximations are already available. Therefore, the first two issues about detecting events and measuring arrival-times in the Geiger method are solved. The combination of a grid-search with a gradient approach will be referred to as a "stabilized Geiger" approach.

With the set of accurate arrival-times and incidence-angles, the technique then adopts a Geiger type of localization and improve the location provided by CMM. The third issue about the classic Geiger method is the convergence to the true solution. Due to the use of gradients, the solution may depend on the initial guess. This issue is solved when the classic Geiger algorithm starts from an initial guess close to the true solution. The objective-function of CMM is different from the Geiger residual-function; therefore these two functions may reach their extrema at different locations. Consequently, in order to be consistent in the optimization problem, a fine grid-search needs to be applied to the Geiger residual-function instead of the CMM objective-function. Run-time and consistency both justify the use of a grid-search procedure of the Geiger residual-function. As a result, a reliable initial guess is provided to the gradient method.

The current implementation of solution steps two and three minimizes the objective function given by equation (4). Two different methods were considered. The first method was inspired by the Rabinowitz algorithm. Instead of minimizing the median residual-error, it was decided to minimize the alpha-trimmed mean residual-value. The search of minimum of the designed residual-function was based on a grid-search. Due to differentiability issues, the refinement of such a location could not be done with a gradient method. It was therefore decided to use a nonlinear simplex method. On the tests conducted, the run-time seemed to be longer and accuracy poorer than the second method implemented. The second and preferred method chosen consisted of minimizing the least-square residual function (i.e. weighted sum of squared residuals as shown in equation (4) by a grid-search first. The refinement of the location obtained was then done with the gradient approach described by Lienert (i.e. "Marquard-Levenberg" algorithm combined with a centering-and-scaling procedure). The flow charts and processing flow of the algorithm are detailed in the appendix.

$$\forall (x, y, z, t) \in SolutionDomain, \quad (4)$$
$$R(x, y, z, t) =$$
$$\sum_{rec} [weight_{Tp}(rec) \cdot R_{Tp}(rec, x, y, z) + weight_{Ts}(rec) \cdot R_{Ts}(rec, x, y, z) + weight_{AzimP}(rec) \cdot R_{AzimP}(rec, x, y, z) + weight_{DipP}(rec) \cdot R_{DipP}(rec, x, y, z) + weight_{AzimS}(rec) \cdot R_{AzimS}(rec, x, y, z) + weight_{DipS}(rec) \cdot R_{DipS}(rec, x, y, z) + weight_{Prior}(rec) \cdot Prior(rec, x, y, z, t)]$$

Where:
$$R_{Tp}(rec, x, y, z, t) =$$
$$[ArrivalTime_P^{measured}(rec) - t - TransitTime_P^{model}(rec, x, y, z)]^2$$

$$R_{Ts}(rec, x, y, z, t) =$$
$$[ArrivalTime_S^{measured}(rec) - t - TransitTime_S^{model}(rec, x, y, z)]^2$$

$$R_{AzimP}(rec, x, y, z) =$$
$$[Azimuth_P^{measured}(rec, ArrivalTime_P^{measured}(rec)) - Azimuth_P^{model}(rec, x, y)]^2$$

$$R_{AzimS}(rec, x, y, z) =$$
$$[Azimuth_S^{measured}(rec, ArrivalTime_S^{measured}(rec)) - Azimuth_S^{model}(rec, x, y)]^2$$

$$R_{DipP}(rec, x, y, z) =$$
$$[Dip_P^{measured}(rec, ArrivalTime_P^{measured}(rec)) - Dip_P^{model}(rec, x, y)]^2$$

$$R_{DipS}(rec, x, y, z) =$$
$$[Dip_S^{measured}(rec, ArrivalTime_S^{measured}(rec)) - Dip_S^{model}(rec, x, y)]^2$$

Prior(rec, x, y, z, t) represents a penalizing function based on prior knowledge, rec=receiver index, 0<rec<(N+1), and N=number of receivers.

Although based on the minimization of the $L_2$ norm, equation (4) can be written in a manner to minimize a different norm. Despite the refinement stage described in this report, the output of the CMM3D stage can be used as a final output yielding an estimate of the hypocenter location and origin-time. When required, the refinement of such a location can be done directly by any optimization technique for the search of the minimum of the residual-function. The combination grid-search followed by a gradient search can for instance be replaced by the following:

- simplex-based search
- grid-search
- gradient search
- beta-section search.
- Probablisitic search
- Any combination of the different search of function-extremum techniques.

The refinement process described herein refers to any direct or indirect use of the CMM3D stage output. A reminder of such output is as following:

- Hyopcentre location
- Hypocentre origin-time
- Hypocentre modeled or approximated travel-times.
- Hypocentre modeled or approximated arrival-times.

Although not mandatory, such output is used to measure the values used in the residual-function or in the search of extremum of a residual-function (e.g. one of the starting points for a search of extremum of the residual function). The refinement stage can be used independently of the CMM3D output. A starting point for the grid search can be defined by a pre-defined location (e.g. check-shot location) or randomly selected in a predefined-region. Before running the refinement stage, measuring values can be done regardless of the output of CMM3D.

In a related exemplary embodiment, the following methodology and sample operation is provided.

Event Detection and Location for a 3D Receiver Distribution

The input data are the 3C traces recorded at each receiver, r, at time samples, t, rotated to the geographic coordinate system: $E_r(t)$, $N_r(t)$, $U_r(t)$. The 3C energy envelope of the traces is defined as follows:

$$En_r(t) = H[E_r(t)]^2 + H[N_r(t)]^2 + H[U_r(t)]^2 \quad (5)$$

where H[f(t)] signifies the envelope computation using the Hilbert transform of the function f(t).

From the 3C energy, the signal to noise ratios for P- and S-waves, $SNRP_r(t)$ and $SNRS_r(t)$, are computed taking time window lengths for signal and noise time windows, stwp and ltwp, respectively:

$$SNRP_r(t) = \frac{ltwp}{stwp} \frac{\sum_{j=t}^{stwp+t-1} En_r(j)}{\sum_{j=t-ltwp-1}^{t} En_r(j)} \quad (6)$$

As S-waves have different frequency content than P-waves, the signal to noise for S-waves, $SNRS_r(t)$, is computed taking different short and long time window lengths, stws and, lws, respectively.

The real-time location algorithm proceeds in two steps: a detection step, where an estimate of $t_0$ and location is made, and a location step, where the estimated $t_0$ and polarizations are used. In both cases a map based on (6) is used.

From the signal to noise ratio for P- and S-waves, the detection map, Det(t,x,y,z), is computed for each time sample, t, and grid node, (x,y,z). The value of the detection map is the product of $SNPP_r(t)$ and $SNRS_r(t)$ at the modeled P- and S-wave arrival times, $tp_r(x,y,z)$ and $ts_r(x,y,z)$ over all receivers, r:

$$Det(t, x, y, z) = \prod_{r=1}^{nr} SNRP_r(t + tp_r(x, y, z)) * SNRS_r(t + ts_r(x, y, z)) \quad (7)$$

When the maximum value of the detection map exceeds a given threshold, then the event is considered detected. Its origin time, $t_0$, is the time of the maximum of the detection map and the origin time uncertainty, $\sigma t_0$, is the time range where the maxima of the detection map around the time, $t_0$, exceed 50% of the maximum at the estimated origin time.

Over the time window, $\sigma t_0$, at the origin time, $t_0$, the location step is then performed. The location requires information about the direction of the incoming energy at each receiver. One solution is to compute a probability function based on the continuously estimated P-wave polarization vector, $\overrightarrow{vm}_r(t)$ and its uncertainty, $\overrightarrow{\sigma}_r(t)$. For each grid position (x,y,z) a probability function is computed taking into account the P-wave modeled polarization vector, $\overrightarrow{vp}_r(x,y,z)$ as follows:

$$PDF_{pol}(x, y, z) = \prod_{r=1}^{nr} \prod_{l=1}^{3} \frac{1}{\sqrt{2\pi}\, \sigma_{ri}(t)} e^{-\left[\frac{vm_{ri}(t) - vp_{ri}(x,y,z)}{2\sigma_{rl}(t)}\right]^2} \quad (8)$$

The location map is then computed from the detection map values and the polarization probability function as follows:

$$Loc(x, y, z) = \frac{1}{\sigma t_0} \sum_{r=t_0-\sigma t_0/2}^{t_0+\sigma t_0/2+1} Det(t, x, y, z) PDF_{pol}(x, y, z) \quad (9)$$

Note: the notation only presents the case where the velocity model is isotropic. In the case of TI velocity model, the times and polarization angles for P and Sh waves are computed and used.

EXAMPLE—SYNTHETIC DATASET

Figure 7:
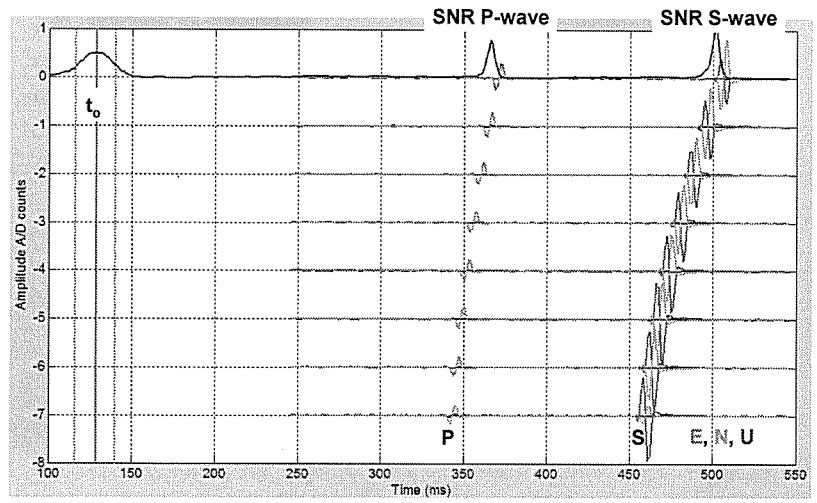
FIG. 7 is an example of a SC synthetic event (East, North, Elevation) for 8 of the 16 receivers. The SNR for P- and Sh-waves is plotted with the estimation of the origin time shown between 100 ms and 150 ms.

Synthetic data are created for events recorded by an array of 16 3C receivers distributed along a horizontal well path at a depth of 10204 ft with an orientation along the East-West direction. The radiation pattern for P and S is isotropic for all sources with a constant amplitude ratio. Minimal noise has been added for this dataset and only Sh shear arrivals are included (no Sv). An example of the 3C traces with the SNR functions (equation 6) for the first receiver is shown in FIG. 7. The origin time, to, estimated at the detection step is also shown, with its uncertainty.

The velocity model used for data modeling and processing is homogeneous anisotropic with the parameters described in Table 2:

TABLE 2

Velocity Model Properties.

| Vp (ft/s) | Vs (ft/s) | Thomsen Epsilon | Thomsen Gamma | Thomsen Delta |
|---|---|---|---|---|
| 15500 | 9100 | 0.2 | 0.2 | 0.1 |

Figure 8:
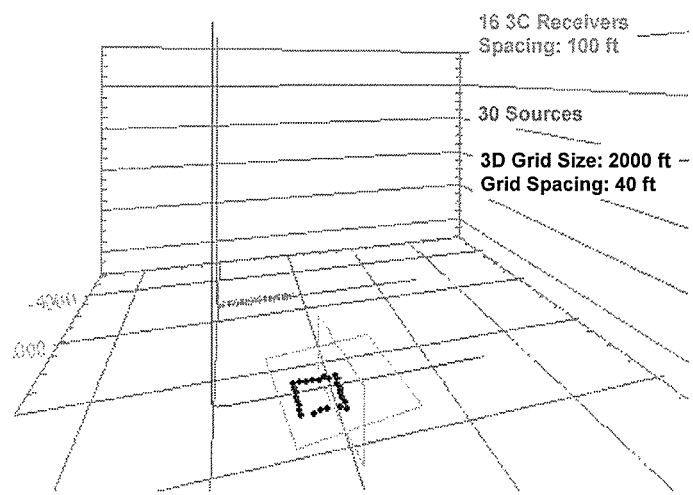
FIG. 8 is a 3D view of the 16 3C receiver positions and 30 source positions with the 3D grid size of 2000 ft and grid spacing of 40 ft.

From the velocity model and receiver positions, the traveltimes and modeled polarization angles at the receivers are computed for a 3D grid. The grid size in the radial, transverse and vertical directions is 2000 ft with a spacing of 40 ft. In the displays that follow the 3D grid position is centered on the first event, located at the same depth as the receivers and oriented toward the middle of the receiver array at a distance of about 3580 ft (FIG. 8).

Figure 9:
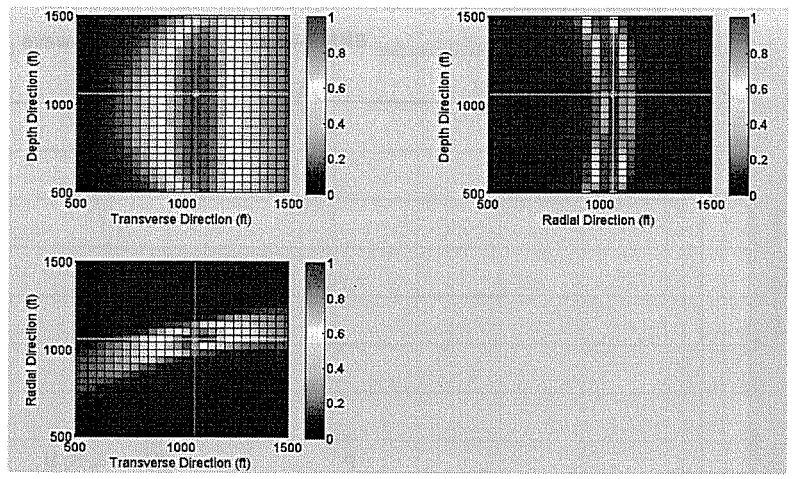
FIG. 9 are Transverse-Depth [top left], Radial-Depth [top right] and Transverse-Radial [bottom left] sections of the 3D detection map computed using equation Eq.7.
Figure 10:
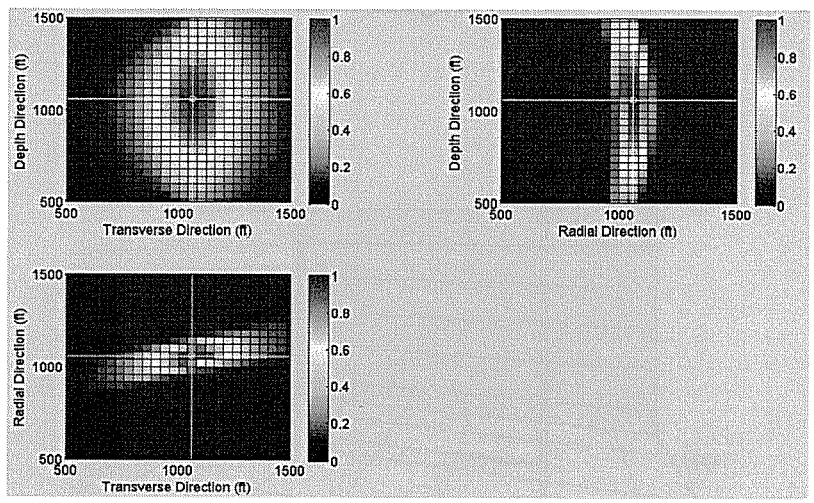
FIG. 10 are Transverse-Depth [top left], Radial-Depth [top right] and Transverse-Radial [bottom left] sections of the 3D location map computed from equation Eq.9.

The detection map in FIG. 9 shows good resolution in plan view. However, no resolution is achieved in the depth section; taking into account only the SNR along the time moveout of the incoming energy is not enough to resolve the location in depth for a horizontally distributed receiver array.

Taking into account the polarization angle using the probability function described in (8), resolution in depth is now achieved, owing to the inclusion of information from the inclination part of the polarization vector. The plan view is very similar to that of the detection map because, due to the horizontal receiver distribution, adding information from the azimuth part of the polarization vector does not improve the horizontal component of location.

EXAMPLE—REAL DATASET

A hydraulic fracturing monitoring took place in Far East Asia from a deviated well. Due to constraints associated to high temperature, only three 3C receivers were deployed between 3800 m and 3925 m where the well deviation was around 30°. During the first stage of heavy brine injection, about 300 events were detected; while during the second injection stage of light brine, about 400 events were detected.

Figure 11:
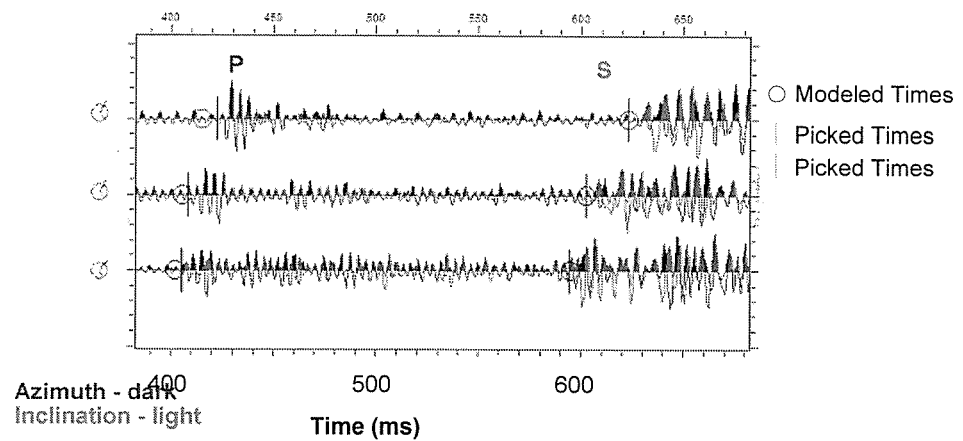
FIG. 11 is an example of one event recorded with three SC accelerometers. The darks ticks are the user picked times for P-waves, the lighter ticks are the times for Sh-waves. The circles are the arrival times from estimated to and location.
Figure 12:
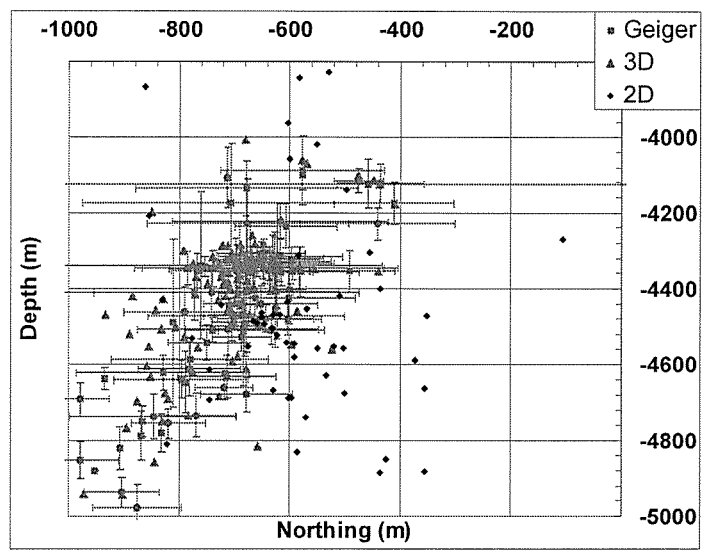
FIG. 12 is a comparison of location results from three methods. The classical Geiger results are shown with error bars; the method of this paper is labeled "3D" with locations shown as red triangles.

Using the 2D approach, the times were not well estimated and the events were on average located 250 m shallower than the locations found using time picks and the Geiger method (Table.3). The 2D origin time and spatial coordinates were significantly different from those of the Geiger approach. For instance, for the event presented in FIG. 11, the origin time was estimated at 146 ms and the coordinates were: North: −899 m; Easting: 1175 m; Elevation: −4066 m whereas using the Geiger method the estimates were: 131 ms; −917 m+/−34; 983 m+/−25 m; −4902 m+/−87 m. The two locations were separated in depth by 837 m. Using the proposed method estimates are: 127 ms; −1000 m; 979 m; −5003 m. On average, the locations estimated using the proposed method are closer to the locations found with the Geiger method. In addition, the locations are far less scattered than the initial 2D location estimates (FIG. 12). Given the short array, the amount of noise in this data set and the large difference in the methods, we judge this to be a favorable comparison.

TABLE 3

Average coordinates in locations between the 2 methods and Geiger method over 110 events.

| | East (m) | North (m) | Elevation (m) |
|---|---|---|---|
| Method 2D | 914 +/− 405 | −732 +/− 381 | −4202 +/− 618 |
| Method 3D | 1100 +/− 130 | −765 +/− 202 | −4486 +/− 299 |
| Geiger | 1056 +/− 95 | −716 +/− 168 | −4477 +/− 274 |

Thus, an algorithm has been described that provides an automatic solution for event detection and location in real-time when the receiver array is distributed in a deviated or horizontal well. This method is based on the estimation of signal to noise ratios at modeled direct arrival times for P- and S-waves. The method introduces the required polarization angle information within a probability function measuring the co-linearity of modeled and local estimates of P-wave polarization angles. Results from a synthetic dataset show good resolution in depth for the extreme case of data acquisition from a receiver array deployed within a horizontal monitor well.

The method is applied to a real data set recorded by an array of three 3C receivers deployed within a well deviated at about 300. The automatic location estimates are improved; the differences with estimates obtained after re-picking and using a gradient-based location inversion are in agreement.

This method is a grid search—based approach. Thus, it depends on the grid location and dimensions. More analysis is required to quantify the trade-off between grid resolution and computation speed.

The resolution of the location depends on the recorded signal, in particular the signal to noise ratios and the radiation pattern covered by the receiver distribution. The accuracy of the proposed solution is dependent on these two key elements.

It will be understood from the foregoing description that various modifications and changes may be made in the preferred and alternative embodiments of the present invention without departing from its true spirit. In addition, this description is intended for purposes of illustration only and should not be construed in a limiting sense.

What is claimed is:

1. A method of detecting and locating a microseismic event, comprising:
   providing an estimate of a velocity model for a formation;
   estimating a volume of space in which the event will most likely occur;
   dividing the volume into a plurality of sub-volumes;
   receiving data of the microseismic event with at least a first and a second seismic sensor located on a tool in a wellbore;
   approximating a location of the event by coalescing a plurality of seismic signals received with the receivers at selected locations and time in the volume to determine in which sub-volume the event occurred, the approximating comprising using coalescence microseismic mapping comprising an objective function suitable for non-vertical seismic sensor array; and
   determining a more precise location of the event by locating the event within the sub-volume utilizing the signals, the determining comprising using a linearized iterative inversion to determine the more precise location of the event within the sub-volume determined using the coalescence microseismic mapping;

wherein the objective function includes azimuth and dip of incident wave, said azimuth and dip having different factors for controlling discrimination sharpness.

2. A method of detecting and locating a microseismic event, comprising:

providing an estimate of a velocity model for a formation;

estimating a volume of space in which the event will most likely occur;

dividing the volume into a plurality of sub-volumes;

receiving data of the microseismic event, the data being indicative of signals received from at least a first and a second seismic sensor located on a tool in a wellbore;

approximating a location of the event in the volume to determine in which sub-volume the event occurred, the approximating comprising using coalescence microseismic mapping comprising an objective function suitable for non-vertical seismic sensor array; and determining a more precise location of the event by locating the event within the sub-volume utilizing the signals, the determining comprising using a linearized iterative inversion to determine the more precise location of the event within the sub-volume determined using the coalescence microseismic mapping;

wherein the objective function includes azimuth and dip of incident wave, said azimuth and dip having different factors for controlling discrimination sharpness.

3. The method of claim 1, wherein the act of determining the more precise location of the event comprises determining a hypocenter of the event.

4. The method of claim 1, wherein microseismic event comprises a microearthquake.

5. The method of claim 1, wherein the act of determining the more precise location comprises selectively discarding at least one candidate location based at least in part on a distance of said at least one candidate to a given location and a waveform content associated with said at least one candidate.

6. The method of claim 1, wherein the approximating the location of the event comprises:

determining modeled arrival times;

performing detection transform of the seismic signals; and mapping the detection transform results using the modeled arrival times to generate a continuously updated spatial map such that the map represents a measure of a likelihood of a source of seismic energy occurring at a time in space.

7. The method of claim 1, wherein the determining the more precise location comprises:

modeling a waveform attribute;

using the signals to measure the modeled waveform attribute; and minimizing a residual function of the modeled waveform attribute and the measurements.

8. The method of claim 1, wherein the act of approximating comprises maximizing the objective function over a time interval and a spatial volume.

9. The method of claim 1, wherein the act of approximating includes a grid search and the act of determining includes a gradient search.

10. The method of claim 1, wherein the act of determining includes computing a location map from a detection map and a probability function for P-wave polarization.

11. The method of claim 1, wherein the act of determining the more precise location of the event comprises determining an origin of the event.

12. The method of claim 2, wherein the act of determining the more precise location of the event comprises determining an origin of the event.

13. The method of claim 2, wherein the act of determining the more precise location of the event comprises determining a hypocenter of the event.

14. The method of claim 2, wherein microseismic event comprises a microearthquake.

15. The method of claim 2, wherein the act of determining the more precise location comprises selectively discarding at least one candidate location based at least in part on a distance of said at least one candidate to a given location and a waveform content associated with said at least one candidate.

16. The method of claim 2, wherein the act of approximating comprises maximizing the objective function over a time interval and a spatial volume.

17. The method of claim 2, wherein the act of approximating includes a grid search and the act of determining includes a gradient search.

18. The method of claim 2, wherein the act of determining includes computing a location map from a detection map and a probability function for P-wave polarization.

* * * * *